United States Patent [19]

Walker et al.

[11] 3,774,404

[45] Nov. 27, 1973

[54] ADIABATIC MAGNETIZATION COOLING NEAR ABSOLUTE ZERO

[75] Inventors: Laurence Richard Walker, Somerset; Russell Erwin Walstedt, Mercer, both of N.J.

[73] Assignee: Bell Telephone Labortories, Inc., Murray Hill, N.J.

[22] Filed: Mar. 19, 1971

[21] Appl. No.: 126,015

[52] U.S. Cl. .............................. 62/3, 62/467, 62/56

[51] Int. Cl. .............................. F25b 21/02

[58] Field of Search .............................. 62/3, 467

[56] References Cited

UNITED STATES PATENTS

| | | | |
|---|---|---|---|
| 2,913,881 | 11/1959 | Garwin | 62/3 |
| 3,004,394 | 10/1961 | Fulton | 62/3 |
| 3,108,444 | 10/1963 | Kahn | 62/3 |
| 3,119,236 | 1/1964 | Lutes | 62/3 |
| 3,125,861 | 3/1964 | Halp | 62/3 |
| 3,393,526 | 7/1968 | Pearl | 62/3 |

OTHER PUBLICATIONS

Physical Review Letters, Vol. 25, Oct. 19, 1970, pages 1094–1095.

Physical Review Letters, Vol. 22, Mar. 10, 1969, pages 449–451.

Physical Review Letters, Vol. 23, Oct. 13, 1969, pages 836–838.

Physical Review Letters, Vol. 21, Aug. 12, 1968, pages 427–429.

*Primary Examiner*—William J. Wye

*Attorney*—R. J. Guenther and Edwin B. Cave

[57] ABSTRACT

Cryogenic temperatures within one millidegree of absolute zero are attained by a combined application of pressure and magnetic field to $He^3$ which has been precooled to below 15 millidegrees. The pressures required are above 33.8 atmospheres and the magnetic fields are between 30 kilogauss and 80 kilogauss.

6 Claims, 3 Drawing Figures

Patented Nov. 27, 1973

3,774,404

2 Sheets-Sheet 1

INVENTORS L. R. WALKER
R. E. WALSTEDT
BY
ATTORNEY

Patented Nov. 27, 1973 3,774,404

2 Sheets-Sheet 2

ADIABATIC MAGNETIZATION COOLING NEAR ABSOLUTE ZERO

BACKGROUND OF THE INVENTION

1. Field of the Invention

Cryogenic refrigeration using $He^3$ as a refrigerant.

2. Description of the Prior Art

A number of materials have unique properties at extremely low temperatures. Thus, the production of lower and lower temperatures has long been of scientific and technological interest. The most abundant isotope of helium, $He^4$, becomes liquid at 4.2° above absolute zero (4.2°K). Much scientific and technical use is made of this liquid as a refrigerant. When the space above liquid $He^4$ is pumped the temperature of the liquid is reduced. Temperatures as low as 1.1°K can be achieved in this way. Temperatures in the 1 degree to 10 millidegree range can be produced by the adiabatic demagnetization of a paramagnetic salt (D.de Klerk, *Handbuch der Physik XV*, 38 [1956]) or by the use of a $He^3$-$He^4$ dilution refrigerator (H. London, G. R. Clark and E. Mendoza, *Physical Review* 128, 1992 [1962]). Temperatures down to approximately 2 millidegree have been produced by the adiabatic compression of liquid $He^3$, the less abundant isotope of helium (*Physical Review Letters* 21, [1969] 44). This cooling effect is produced by the phase transformation of liquid to solid He upon the application of pressure. Notwithstanding the above techniques, the temperature region below 1 millidegree still represents a frontier of cryogenic technology.

SUMMARY OF THE INVENTION

It has been found that temperatures within one millidegree of absolute zero are attainable by the combined application of pressures above 33 atmospheres, and magnetic fields between 30 kilogauss and 80 kilogauss to $He^3$ which has been precooled to temperature below 15 millidegrees. Experimental and theoretical investigation of the thermodynamic properties of liquid and solid $He^3$ has shown that the application of large magnetic fields has several important effects.

1. These effects are especially pronounced in the neighborhood of the paramagnetic critical field ($H_c \sim$74 kilogauss) the field above which solid $He^3$ is paramagnetic near absolute zero. Fields of this magnitude reduce, by two orders of magnitude, the temperature at which the entropy of solid $He^3$ becomes less than the entropy of liquid $He^3$ which is the theoretical lower limit of adiabatic compression cooling.
2. At pressures above 29 atmospheres such fields displace the melting curve of $He^3$ to lower temperatures. This effect is especially pronounced above 33.8 atmospheres.
3. Fields close to $H_c$ (within + 1 percent and −3 percent) cause a sharp cooling of the solid. All of these effects permit the production of lower temperatures than those produced in the absence of a magnetic field.

Due to (1), $He^3$ precooled to below 15 millidegrees before and subject to a magnetic field between 30 and 80 kilogauss will reach temperatures below 1 millidegree under adiabatic conditions. Due to (2), $He^3$ precooled in the absence of magnetic fields to a temperature at which solid begins to form at a pressure above 29 atmospheres, is cooled upon the application of a magnetic field. This effect is most pronounced at pressures above 33.8 atmospheres. At such pressures temperatures below one millidegree are produced. Due to (3) an additional cooling of the solid $He^3$ is produced at fields within + 1 percent and −3 percent) of $H_c$.

DETAILED DESCRIPTION OF THE INVENTION

ADIABATIC COMPRESSION COOLING

Figure 1:
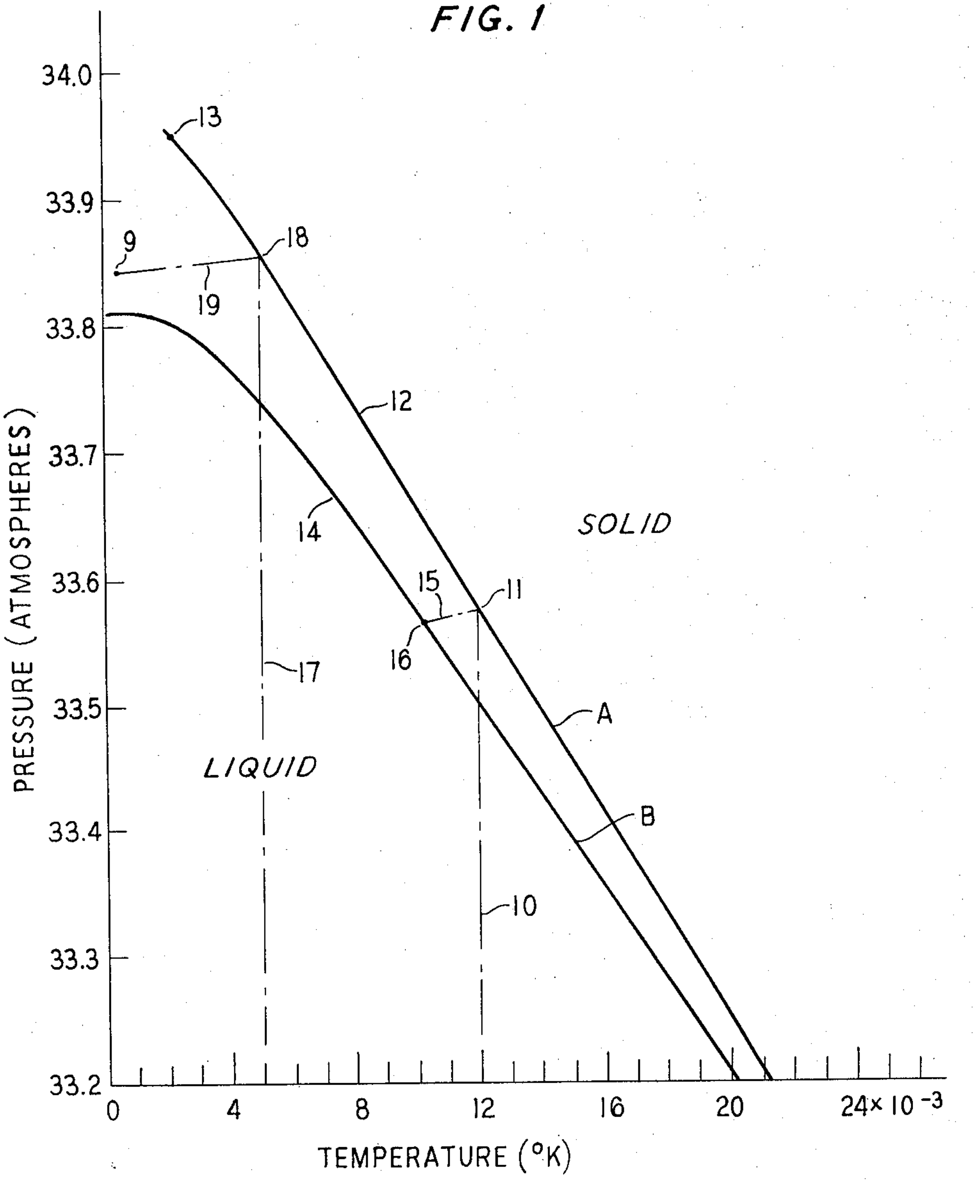
FIG. 1 is a curve representing the equilibrium melting curve of $He^3$ under zero magnetic field (curve A) and under a magnetic field equal to $H_c$ (curve B). The ordinate is pressure in units of atmospheres and the abscissa is absolute temperature.

Refrigeration to temperatures of the order of two millidegrees by the method of adiabatic compression cooling can be understood by reference to FIG. 1, the pressure-temperature phase diagram of $He^3$. The $He^3$ refrigerant is placed in a cryogenic vessel which can be constricted in order to exert pressure on its contents. This vessel and its contents are then brought into thermal contact with another refrigeration device such as $He^3$-$He^4$ dilution refrigerator and the $He^3$ within the vessel is cooled to, for instance, 12 millidegrees above absolute zero ($12 \times 10^{-3}$° K). The pressure on the $He^3$ is then increased and the point on FIG. 1 representing the state of the $He^3$ moves between along the dashed line 10. The pressure is further increased until point 11 is reached, at which time some of the helium just begins to solidify. A further increase of pressure on the $He^3$ results in progressive solidification of more and more of the liquid and the state of the system moves upward and to the left along line 12, the melting curve, until all the liquid has been solidified and the system reaches a point at some lower temperature such as point 13.

Figure 2:
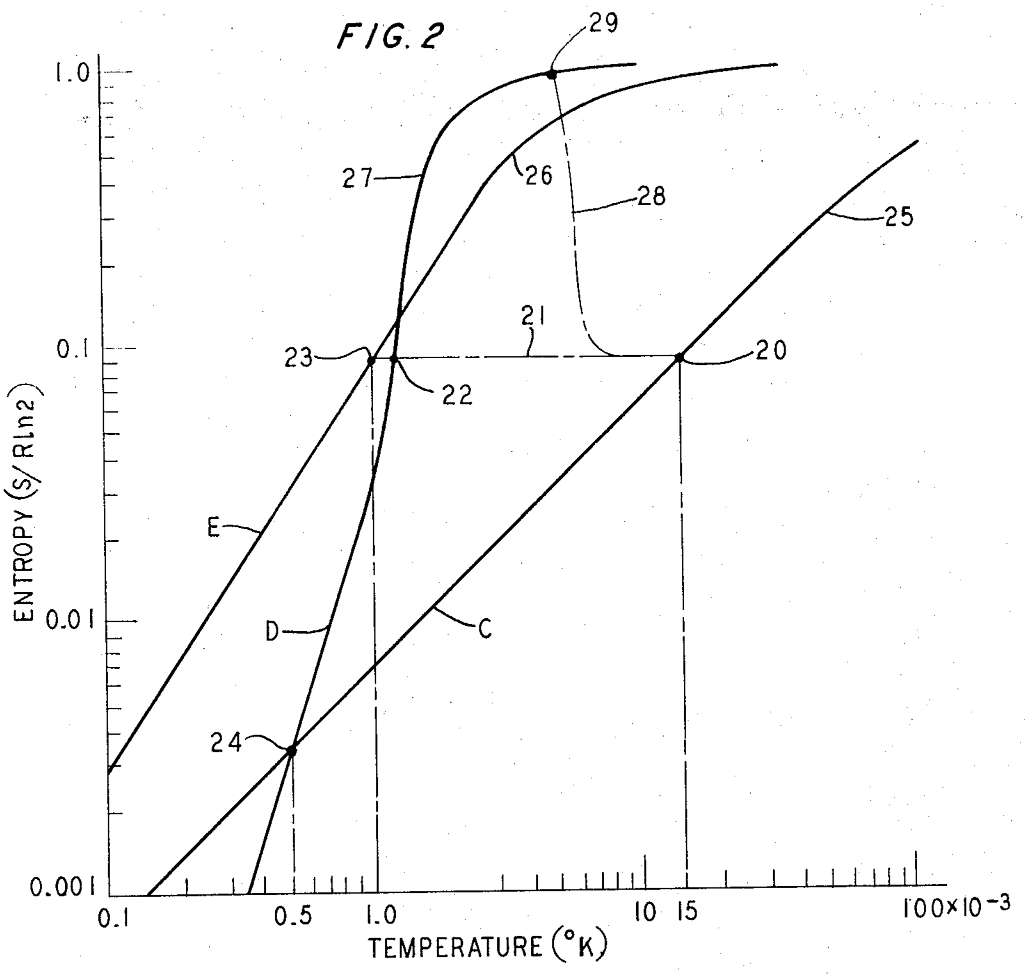
FIG. 2 is a curve representing the entropy (ordinate) as a function of absolute temperature (abscissa) for liquid $He^3$ (curve C), solid $He^3$ in zero magnetic field (curve D) and solid $He^3$ in a magnetic field equal to $H_c$ (curve E)

Further understanding of the process can be had by reference to FIG. 2 which shows the entropy, as a function of temperatures of liquid $He^3$ (25), solid $He^3$ (27) and solid $He^3$ under a 74 kilogauss magnetic field (26). Point 20 on curve 25 represents the entropy of the liquid $He^3$ at 15 millidegrees (normalized by Rln2, where R is the Universal Gas Constant). As the pressure on the liquid is increased slowly and reversibly the entropy of the system remains constant. After solid $He^3$ begins to form, the state of the system proceeds to the left along line 21 until all of the liquid is converted to solid. Under conditions of constant entropy (adiabatic) the point 22 on curve 27 will be reached. If there are frictional losses in the system, such as the rubbing together of crystals of solid $He^3$, as the system is being compressed, the entropy of the system increases and the state of the system moves for instance along line 28 until the helium is completely solidified at point 29. Temperatures of the order of two millidegrees have been produced by this method starting from temperatures between 20 and 50 millidegrees (*Physical Review Letters*, 22 [1969] 449). The theoretical lower limit of temperature which can be produced by this process is approximately 0.5 millidegree as represented by point 24 which is the intersection of the liquid and solid entropy curves 25, 27. As indicated above, this theoretical limit has never been achieved due, perhaps, to frictional effects.

EFFECTS OF MAGNETIC FIELDS

When a large magnetic field is applied to the $He^3$ a number of effects are observed in the thermodynamic properties of the system. Firstly, the $He^3$ melting curve of FIG. 1 (represented by curve 12 in zero magnetic field) moves to the left for pressures above 29 atmospheres where the curve goes through a minimum. The major portion of this motion takes place above 30 kilogauss. As the magnetic field is increased and reaches the paramagnetic critical field, $H_c$, (~74 kilogauss) curve 14 is reached. When, for example, the $He^3$ refrigerant is precooled as before to 12 millidegrees and the pressure increased under zero magnetic field, the state of the system moves upward along line 10 until point 11 is reached. When thermal contact with the external refrigerator is then broken and a magnetic field is then applied to the system, the state of the system moves along a line such as line 15 while some of the liquid is converted to solid until $H_c$ is reached at point 16 (assuming that all of the liquid has not been converted to solid before point 16 is reached). This process is termed adiabatic magnetization cooling. If prior to the application of magnetic fields the temperature of the system is reduced by adiabatic compression cooling to a temperature below 6 millidegrees, temperatures below one millidegree are reached. For example, a system starting at point 18 will, upon application of a magnetic field proceed along a line such as line 19 until point 9 is reached, assuming that all of the liquid has not previously been converted to solid. This process avoids friction losses caused by the rubbing together of $He^3$ crystals during compression.

FIG. 2 illustrates the change in the entropy curve of solid $He^3$ under a magnetic field equal to $H_c$. Curve 27 represents the entropy curve of solid $He^3$ under zero magnetic field while curve 26 represents the entropy curve of solid $He^3$ under a magnetic field equal to $H_c$. It can be seen by comparison of these two curves that an adiabatic compression process starting from a temperature less than of the order of 15 millidegrees proceeds, under adiabatic conditions, to the left along a line of constant entropy to a lower temperature when the helium is subjected to a magnetic field than when the helium is in a low magnetic field region. For example $He^3$ starting out at point 20 and adiabatically compressed will proceed at constant entropy to point 23. A lower temperature than that reached in the absence of magnetic field point 22. As the starting temperature is reduced adiabatic compression cooling proceeds to much lower temperatures and indeed the intersection between curves 25 and 26, the theoretical limit of adiabatic compression cooling under a magnetic field, is reduced of the order of two orders of magnitude below the temperature of point 24, the zero field limit. Thus, lower temperatures are reached in the presence of the contemplated magnetic fields than in their absence. These lower refrigerant temperatures can be used in the study of the physical properties of the refrigerant itself or can be used in the cooling of another substance in thermal contact with the refrigerant.

EXEMPLARY APPARATUS

Figure 3:
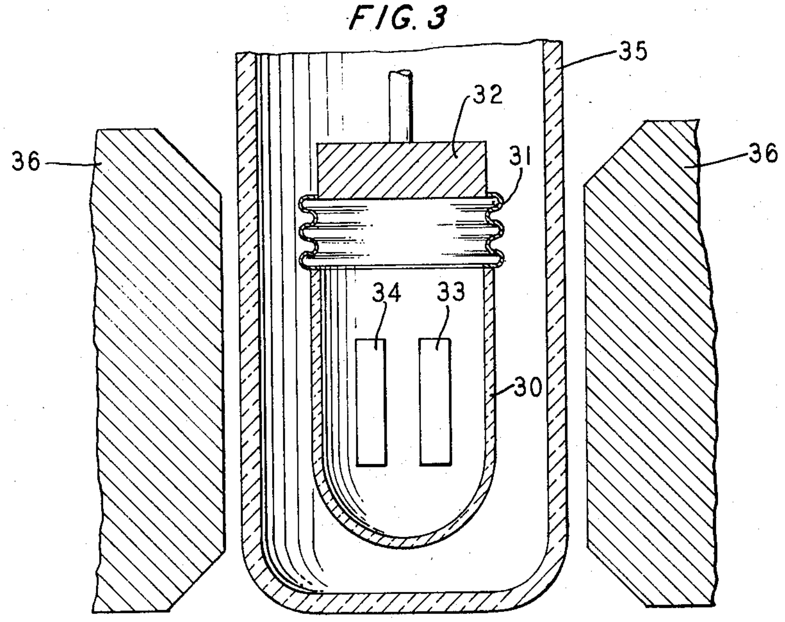
FIG. 3 is a plan view in section of an exemplary $He^3$ refrigeration device.

FIG. 3 shows, in schematic form, the basic elements used to produce cooling according to the invention. $He^3$ is contained within a vessel 30 which is equipped with some means such as flexible metal bellows 31 and a piston 32 for the application of pressure to the enclosed $He^3$. In addition to the $He^3$ the vessel 30 may also contain an object to be cooled 33 and/or a thermometric substance 34. Using the thermometric substance 34, the temperature attained may be measured by some technique such as nuclear magnetic resonance using means not illustrated. A portion of the cryostat required is shown schematically as the thermally insulating sleeve 35. The large magnetic field required for this method of refrigeration may be supplied by any of the field generating techniques known in the art such as a large external magnet whose pole piece 36 are illustrated or perhaps by a superconducting solenoid incorporated within the cryostat.

What is claimed is:

1. A cooling method comprising compressing a refrigerant consisting essentially of a mixture of solid and liquid $He^3$ to a pressure greater than 29 atmospheres characterized in that the method comprises imposing upon the refrigerant a magnetic field of magnitude between $30 \times 10^3$ gauss and $80 \times 10^3$ gauss whereby the temperature of the refrigerant is reduced below that temperature produced in the absence of the magnetic field.

2. A method of claim 1 in which the compression of the refrigerant takes place prior to the imposition of the magnetic field.

3. A method of claim 2 in which the pressure is greater than 33.8 atmospheres.

4. A method of claim 1 in which the magnitude of the magnetic field is between +1 percent and −3 percent of $74 \times 10^3$ gauss.

5. A method of claim 1 comprising bringing the refrigerant to an initial temperature less than $15 \times 10^{-3}$° K in which the compression of the refrigerant takes place subsequent to the imposition of the magnetic field.

6. A method of claim 1 comprising bringing the refrigerant into thermal contact with a body thus reducing the temperature of the body.

* * * * *